United States Patent [19]
Andersson et al.

[11] Patent Number: 5,446,973
[45] Date of Patent: Sep. 5, 1995

[54] PROCESS AND APPARATUS FOR DRIVING AWAY ADSORBATES

[76] Inventors: Jan Andersson; Lars Nilsson, both of Blomsterslottet, S-669 00 Deje, Sweden

[21] Appl. No.: 108,711
[22] PCT Filed: Apr. 23, 1992
[86] PCT No.: PCT/SE92/00264
§ 371 Date: Sep. 27, 1993
§ 102(e) Date: Sep. 27, 1993
[87] PCT Pub. No.: WO92/19374
PCT Pub. Date: Nov. 12, 1992

[30] Foreign Application Priority Data
Apr. 25, 1991 [SE] Sweden ................. 9101251

[51] Int. Cl.⁶ ............................ F26B 21/06
[52] U.S. Cl. ............................ 34/80; 34/473
[58] Field of Search ............ 34/80, 472, 473

[56] References Cited
U.S. PATENT DOCUMENTS

| | | | |
|---|---|---|---|
| 3,436,839 | 8/1969 | Ellington | 34/80 |
| 4,338,198 | 7/1982 | Brown | 210/673 |
| 4,391,586 | 7/1983 | Brown | 432/58 |
| 4,805,317 | 2/1989 | Inglis et al. | 34/80 |

FOREIGN PATENT DOCUMENTS
3141484  5/1987  Germany .
PCT/SE89/0-0214  4/1989  WIPO .

*Primary Examiner*—Ronald C. Capossela
*Attorney, Agent, or Firm*—Michael D. Bednarek; Marks & Murase

[57] ABSTRACT

A process and an apparatus for desorption, e.g. desorbing a solvent, from a bedding (4) of adsorbent material (14), e.g. activated carbon, by means of a hot gas flow, e.g. air, so that a wave of concentration induces, which goes through the bedding by means of the hot gas flow. The invention is characterized in that the concentration wave is controlled to reach the gas flow outlet of the bedding surface successively.

12 Claims, 3 Drawing Sheets

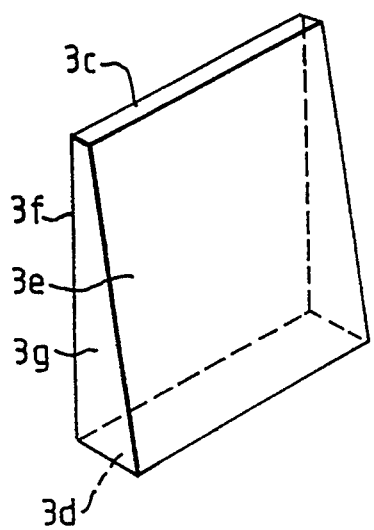
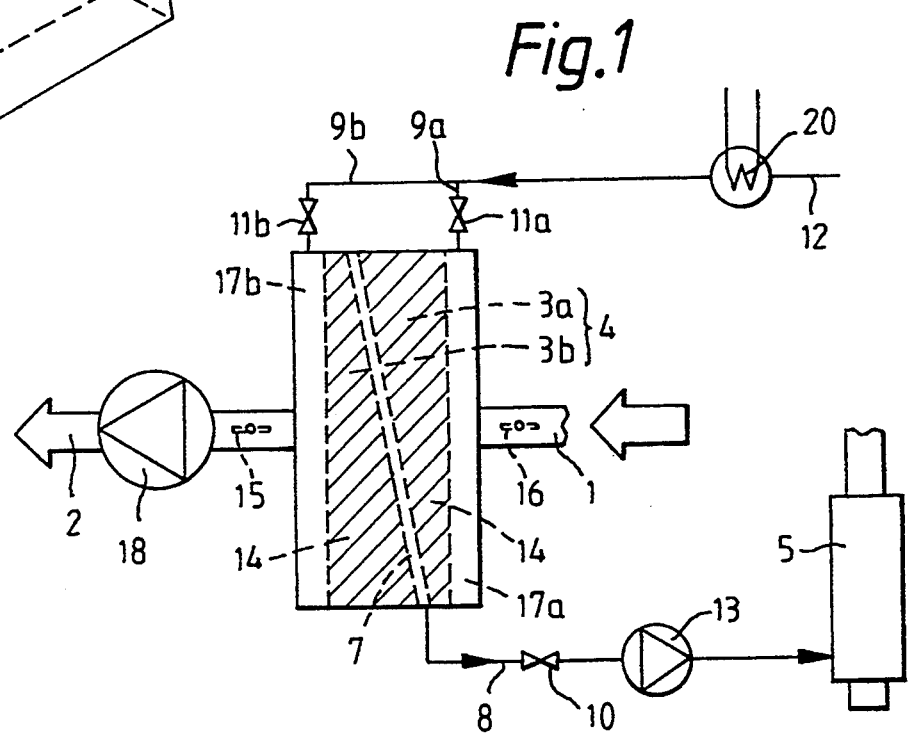
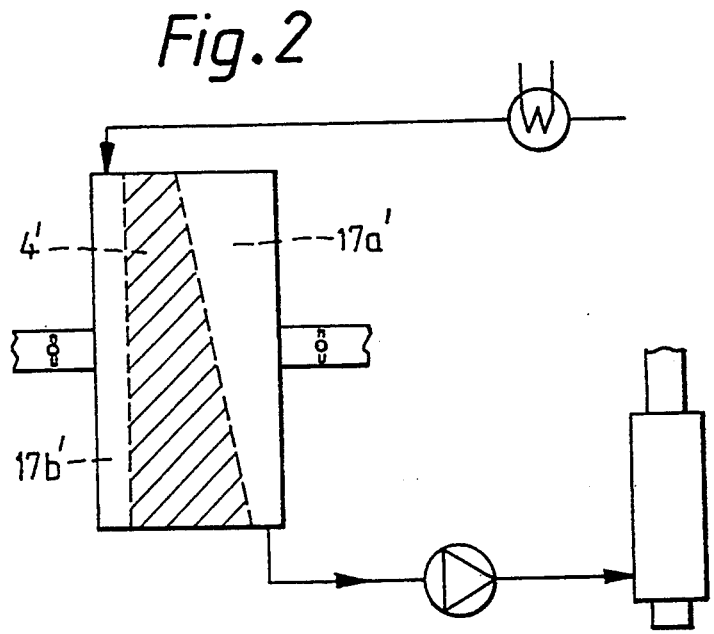

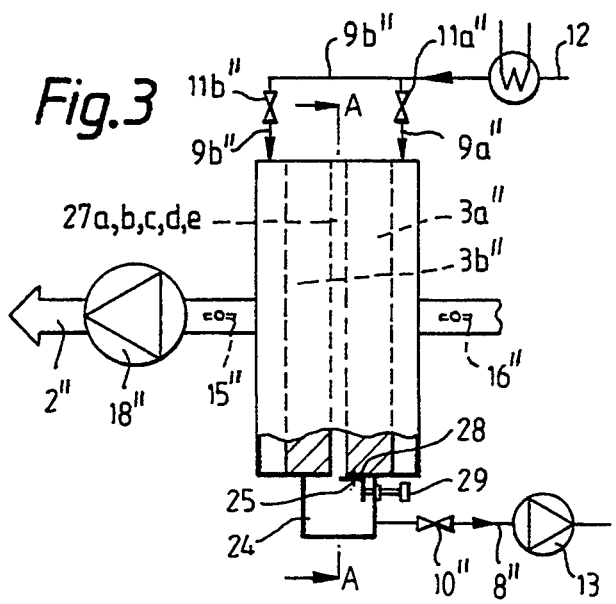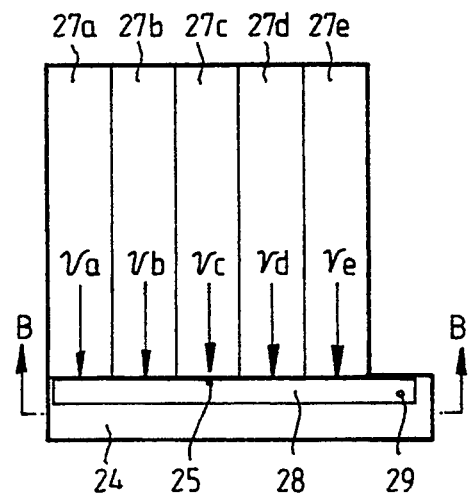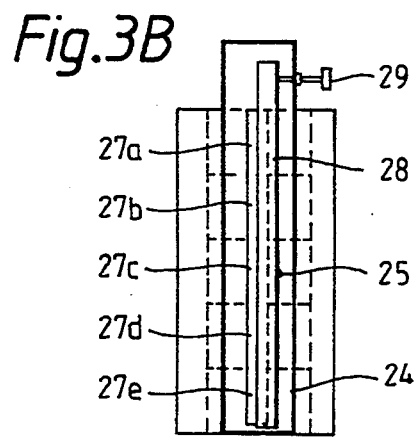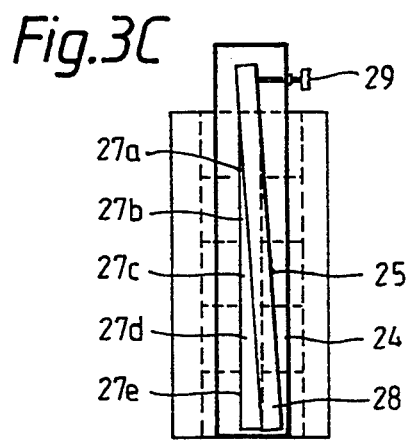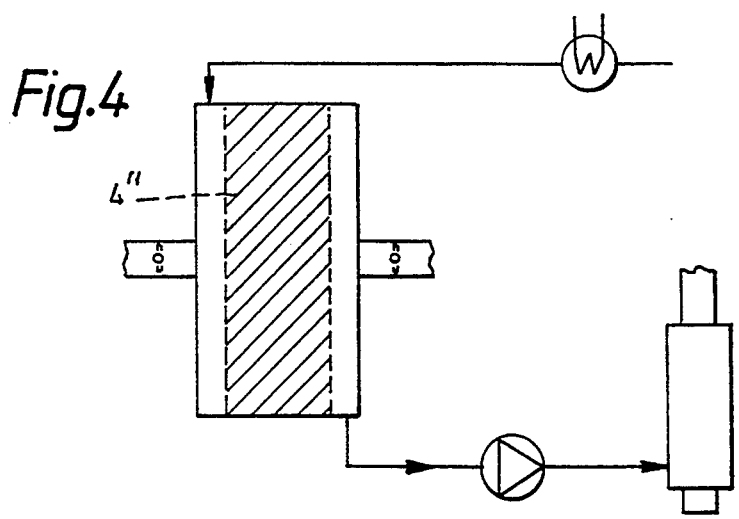

PROCESS AND APPARATUS FOR DRIVING AWAY ADSORBATES

TECHNICAL FIELD

The present invention relates to a process for desorption, e.g. desorbing a solvent, from a bedding of adsorbent material, e.g. activated carbon, by means of a hot gas flow, e.g. air, so that a wave of concentration induces, which goes through the bedding by means of the hot gas flow. The invention also relates to an apparatus, in which the process will be carried out.

BACKGROUND TO THE INVENTION AND PRIOR ART

Cleaning out solvent from contaminated air by means of adsorption and subsequent desorption of matter(s) is a well known engineering practice. As adsorbent material, activated carbon is often used. To regenerate the activated carbon, the temperature is raised and volatile solvents evaporate. For heating purpose a direct inlet of a hot gas stream which can be condensable, e.g. steam, or non-condensable, e.g. nitrogen, can be used. Heating can also be caused indirectly via heating surfaces, at which the means of heating will be kept separate from the adsorbent material.

Adsorption beddings can be solid, which is the most common construction. During continuous operation, the air must change over to a new bedding when the adsorption capacity of the working bedding is exceeded. The adsorption bedding can also be rotating and segmented, thus air to be purified passes through one segment while strip gas passes through another segment. In this manner, a simultaneous purification of contaminated air and a regeneration of the adsorbent is taking place. A drawback with this construction is that it is expensive and bulky.

At desorption in a solid bedding with s hot, non-condensable strip gas a heat front with steep temperature gradient will slide through the bedding. If the gas flow is uniform the heat front will be parallel to the frontal surface of the bedding, that is, the surface through which the strip gas penetrates into the bedding. In the flow direction, in the front of the heat front, an area will form in which the solvent concentration in the activated carbon increases due to readsorption of desorbate, which has desorbed behind the heat front. Thus, in front of the heat front a concentration wave will form, that is, an area with increased solvent concentration. When this concentration wave reaches the outer surface of the bedding, the concentration in the strip gas leaving the bedding will rise to a level that can be many times higher than the average concentration in the outgoing strip gas during the phase of desorption.

The varying concentration of solvent in the outgoing strip gas will in a construction with solid bedding lead to that air only under certain conditions can be used as strip gas. A risk arises that the solvent concentration, during a certain part of the phase of desorption, can become an explosion hazard. Due to the explosion risk, constructions with solid bedding often require nitrogen or another relatively expensive inert gas to be used as strip gas.

At the same time new laws and regulations have resulted in higher demands for purification of solvent-contaminated exhaust air as well as increasing efficiency of gas purifying equipment. Hence, it is important that apparatuses for cleaning can be made small, effective and inexpensive to run.

BRIEF DISCLOSURE OF THE INVENTION

The purpose with the invention is to offer a process which allows disadvantages in known technology to be eliminated.

This assignment has been solved through a process at which the concentration wave is controlled to successively reach the gas outlet of the bedding. An apparatus in which the invention will be carried out is characterized in that bedding surfaces, where the gas flow passes, by means of relative position and/or controlling of gas flow, are so arranged that the wave of concentration, induced by the gas flow in the bedding, successively reaches the gas outlet in the bedding.

Further advantages and distinctive features of the invention will be evident in the following description and the appending claims.

In the description, the invention will be illustrated by example of desorption of adsorbate. It shall be realized that the principles of the invention are applicable also for driving away absorbate or in a combination adsorbate and absorbate.

BRIEF DESCRIPTION OF DRAWINGS

In the following description reference will be made to the accompanying drawings, in which FIG. 1 shows an explanatory sketch, illustrating devices and components of an apparatus for gas cleaning and desorption of adsorbate according to a first preferred embodiment of the invention, FIG. 1A schematically shows a perspective view of an element of the bedding which is a part of the apparatus in FIG. 1, FIG. 2 shows a cross-section of an adsorbent bedding according to a second embodiment of the invention, which is being used in the exemplified experiments, FIG. 3 shows a cross-section of an adsorbent bedding according to a third embodiment, in which the bedding elements have the shape of rectangular parallelepipeds, FIG. 3A shows a cross-section along the line A—A in FIG. 3, FIG. 3B shows a cross-section along the line B—B in FIG. 3A, FIG. 3C shows the same view as FIG. 3B but where a throttle to throttle down the strip gas is inclined, FIG. 4 shows a cross-section of an adsorbent bedding according to known technology, and which is used in comparison experiments, and FIG. 5 constitutes a graph showing the content of solvent in the gas flow of desorption in the outlet from purifying beddings according to the mentioned first, second and third embodiments.

DESCRIPTION OF EMBODIMENTS

Figure 5:
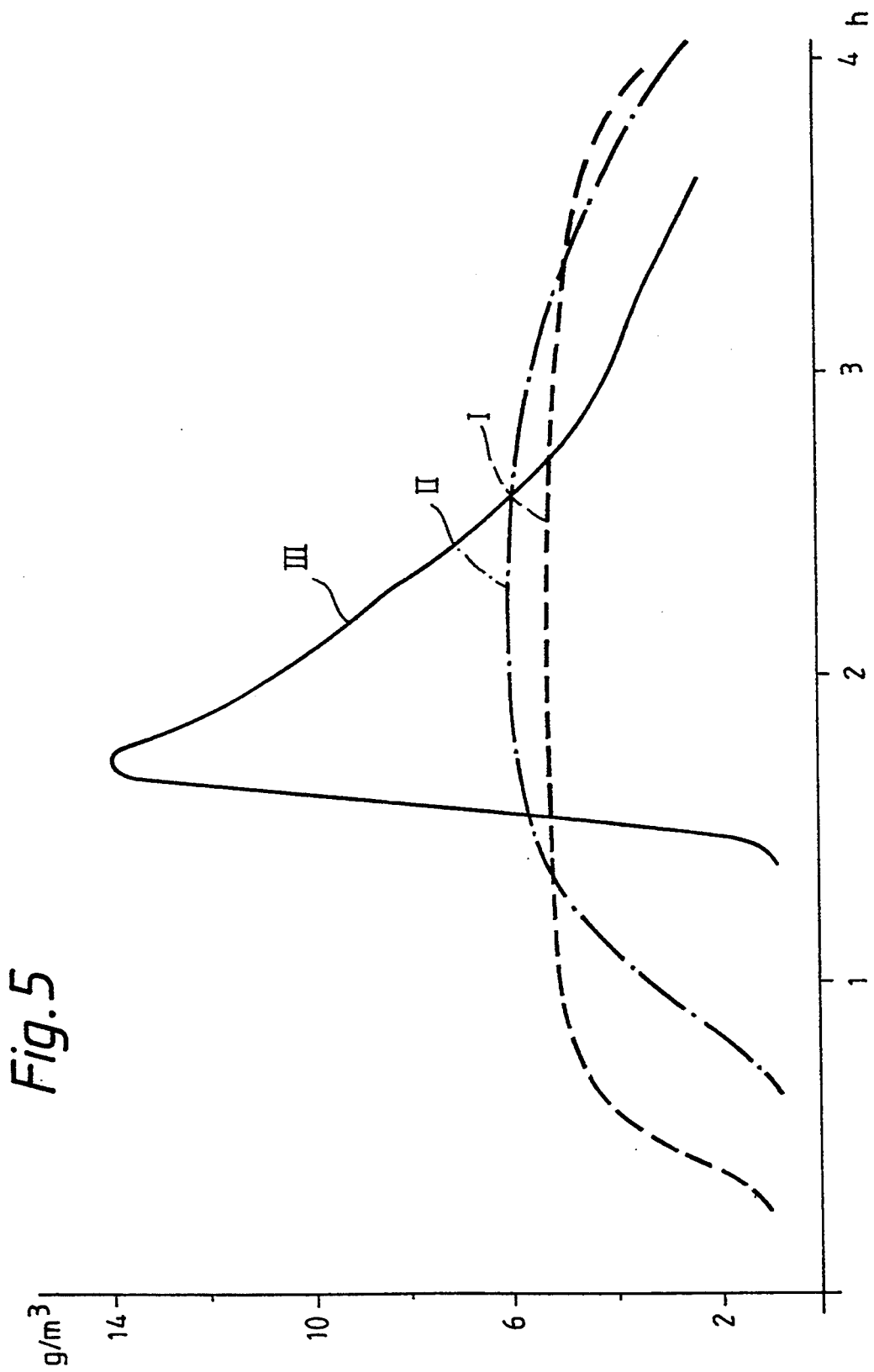

In FIG. 1 an inlet for contaminated air is designated 1, and outlet for purified air designated 2, and bedding elements designated 3a and 3b, respectively. All together they constitute a bedding 4 for purifying contaminated air. A throttle valve 15 is provided in the outlet 2 for purified air and a throttle valve 16 is provided in the inlet for contaminated air.

Each bedding element 3a, 3b has the shape of a hexahedron with three rectangular faces 3c, 3d, 3e, one square face 3f and two trapeziformed faces 3g with two right-angled corners. One of the rectangular faces—face 3e—inclines compared to the square outer face 3f forming a non-right-angle with both the other rectangular faces 3c, 3d, which are forming topface and bottomface in the element. The inclination between the surfaces 3e and 3f is such that the relation between the longer and the shorter parallel edges of the trapeziformed face 3g is at least equal to 1.5 and at the most equal to 3.

The bedding 4 is formed by the two bedding elements 3a, 3b through an arrangement where the inclining faces 3e are facing against each other, in reversed order, so that the bedding 4 obtains the shape of a parallelepiped. The two elements 3a, 3b are separated by a disc-shaped slot 7. It is to be perceived that this has the same inclination as the faces 3e. Preferably the two bedding elements 3a, 3b are similar, and the slot 7 will remain inclined and symmetrical throughout the bedding 4. The bedding elements 3a, 3b contain granular adsorbent material, e.g. activated carbon 14. Other adsorbent materials and/or absorbent materials can be used as well, e.g. zeolites, adsorbent polymers, ion-exchangers and corresponding material.

The outer faces 3f and inner faces 3e (situated opposite to each other) of the bedding elements 3a, 3b can be made out of perforated plate, net or similar allowing passage of contaminated air for purification and strip air for regeneration of the adsorbent material 14. Other faces 3c, 3d, 3g are tight.

A suction fan 18 is arranged in the outlet 2 for purified air. The suction fan 18 will establish necessary negative pressure to lead the air stream in the requested direction from the source of rough gas, that is, through inlet 1 to a first air box 17a on the inlet side of the bedding 4, from there through the first bedding element 3a, through the slot 7 and through the second bedding element 3b to a second air box 17b on the outlet side of the bedding 4 and to the outlet 2.

A burner is designated 5. Solvent, removed from the bedding 4 via the slot 7, which via a pipe is connected with the burner 5, will combust in the burner. A strip gas fan 13 is provided in the pipe 8. The strip gas fan 13 is arranged so that during regeneration a necessary negative pressure establishes to suck hot strip gas from an inlet 12 for strip gas, via the pipes 9a, 9b to the air boxes 17a, 17b, and from the air boxes 17a, 17b through the bedding elements 3a and 3b, respectively, and to the slot 7, where the two gas flows join. From the slot 7 the resulting gas flow goes through the pipe 8 to the burner 5. The feed of strip gas to the air boxes 17a, 17b can be interrupted and regulated with valves 11a, 11b in the pipes 9a, 9b. A heating device for strip gas in the pipe 12 is designated 20.

The device according to FIG. 1 is part of a regenerating system for gas purifying based on adsorption in a bedding with granular adsorbent material, at which the regeneration of the bedding takes place through desorption of adsorbate by means of heating and venting the adsorbent material. This heating and venting takes place therein such that hot strip gas is led through the bedding. The equipment can for instance be used for air purification during one shift per twenty-four hours, while regeneration of the adsorbent material takes place during another shift.

During the phase of air purification the valves 15 and 16 are open, and the valves 11a, 11b and 10 for strip air are kept closed. The contaminated air is brought into the device via the pipe 1 and is led with retained flow direction through the bedding 4 to the outlet 2 for purified air. Air is cleaned therein such that impurities, for instance solvent, are adsorbed by the adsorbent material 14 in the bedding 4. The bedding 4 has a limited adsorption capacity. Hence, the adsorbent material must be regenerated at even intervals according to a prior decided cycle or latest when the adsorption capacity of the bedding has reached saturation. During the phase of regeneration, the valves 15 and 16 are kept closed, while the valves 11a, 11b and 10 are open. Strip air is sucked through the system by means of the fan 13. From the pipe 12 the hot air divides into two flow fractions. One flow is led via the pipe 9a and the valve 11a into the first air box 17a. The other flow is led via the pipe 9b and the valve 11b into the air box 17b. By means of the valves 11a, 11b the stream of strip air going to their respective air boxes can be regulated. From the air boxes 17a, 17b the hot strip air will be sucked through the hexahedron shaped bedding element 3a and 3b, respectively, to the slot 7. From there the rejoined flow of strip air will be sucked through the pipe 10 to the burner 5.

Owing to that the bedding elements 3a, 3b in cross-section have the shape of a trapezium, the strip air will have a varying distance to pass through each bedding element, dependent of the area in which the air penetrates through the bedding material. In the lower part of the bedding element 3a, and in the upper parts of the bedding element 3b, respectively, the strip air has a relatively short path to go through the bedding material from each air box 17a, 17b to the slot 7, while strip air in the upper parts of the bedding element 3a, and in the lower parts of the bedding element 3b, respectively, has a relatively longer path to go through the bedding material. The result is that the heat front which forms in the bedding material due to the hot strip air successively reaches the slot 7, starting in the "thinner" sections of the bedding elements 3a, 3b. Therefore the slot 7 will receive the released combustible contaminants, for instance solvents, at a moderate concentration during a proportionately long time, which is advantageous, since explosion hazard thereby can be avoided. Thus, the burner 5 can receive strip air with suitable proportion of solvent without risk. Through combustion in burner 5 the evaporated solvent or corresponding contaminant will be destroyed.

Consequently, through the invention one achieves a high uniform concentration of solvent in the outgoing strip gas during regeneration which is important for the combustion step. Particularly important is that fumes of solvent in the strip gas will not reach a concentration where explosion hazard exists. This is thus achieved therein that the concentration wave in front of the advancing heat front successively reaches the bedding surface on the outlet side, in this case the faces 3e, situated opposite of the slot 7, that is, the concentration wave passes out through a bedding surface 3e which is not parallel to the wave itself and consequently not parallel to the heat front.

During the regeneration phase the two bedding elements 3a and 3b are connected in parallel, wherein the desired effect with a successive outlet of the concentration wave is achieved. However, during the purification phase the bedding elements 3a and 3b are connected in series, in which case the bedding 4 works as a conventional solvent filter shaped as a rectangular parallelepiped, which is favourable because it allows an optimal utilization of the adsorbent material.

In FIG. 2 an embodiment is illustrated where the bedding 4' has the shape of a hexahedron with in principle the same design as one of the bedding elements 3a, 3b in the previous embodiment. In this case the most narrow part of the bedding must be dimensioned with consideration of desired capacity over the bedding, which involves that the thicker parts of the bedding must be overdimensioned. That means that the adsorbent material cannot be utilized optimally in this case. This embodiment is in other words not the best one. Not even during regeneration can it be achieved as high levelling out of the concentration wave as in the previous embodiment. Yet, compared to a completely parallelepipedically shaped bedding, significant advantages are achieved.

FIG. 3 shows an embodiment at which the bedding elements have the shape of rectangular parallelepipeds. The device in FIG. 3 corresponds to a large extent to the device in FIG. 1. Thus, the device in FIG. 3 is equipped with valves 11a", 11b" and 10", pipes 9a", 9b" and 8", throttle valves 15" and 16" and an outlet for purified air 2", which all have their equivalent in the device in FIG. 1. The device in FIG. 3 has also two bedding elements 3a", 3b", but in distinction to the device in FIG. 1, each one of them has the shape of a rectangular parallelepiped.

Between the bedding elements 3a", 3b" there is a space which is divided into vertical ducts 27a, b, c, d, e with rectangular cross-section. The ducts are made of vertical rectangular plates, arranged between the bedding elements 3a", 3b". At the lower ends of the ducts 27a, b, c, d, e, a suction box 24 for strip air is provided. The box is connected with the suction fan 13" via a pipe 8", equipped with a valve 10".

At the lower ends of the ducts 27a, b, c, d, e, a throttle 28 is arranged. The throttle 28 can be made of an angle bar that can be turned around a vertical axis 25 and be positioned in different angles of rotation by means of a screw or similar means. In the position shown in FIG. 3B, the strip air is damped equally much in each of the ducts 27a, b, c, d, e. If the throttle 28 is twisted to the position shown in FIG. 3C, the strip air will be damped maximally through the duct 27a and not damped at all through the duct 27e.

During the phase of air purification the throttles 15", 16" are open and the valves 10" and 11a", 11b" are closed. The fan 18" then sucks poluted air through the bedding elements and in a horisontal direction through the ducts 27a, b, c, d, e.

During the regeneration of the bedding elements the throttles 15", 16" are closed and the valves 10" and 11a", 11b" are opened, wherein strip air is sucked through the bedding elements 3a", 3b" towards the ducts 27a, b, c, d, e. The inclination of the throttle 28 causes a throttle down in the passage between the ducts 27 and suction box 24. This throttling down caused by the inclination shown in FIG. 3C has the largest effect in duct 27e. Ducts laying inbetween receive a successively decreasing throttling in direction from duct 27a to duct 27e. The pressure drop due to throttling down is large compared to the pressure drop in the ducts 27a, b, c, d, e meaning that the amount of air going through each single duct 27a, b, c, d, e will depend on how far the throttling down has gone. By those ducts 27a, b, c, d, e having a passage, with large cross-section, from the duct to the box 24 the amount of air passing will be relatively large and by ducts having a smaller cross-section the corresponding amount of air passing will be smaller. Since the ducts 27a, b, c, d, e have the same cross-section, the strip air speed in each duct 27a, b, c, d, e will vary with the cross-section in the passage to the box 24. When increasing the cross-section, the airflow passing the duct increases and with that the speed of strip air. In FIG. 3A there are arrows $V_a$, $V_b$, $V_c$, $V_d$, $V_e$ to show how the strip air speed increases stepwise from duct 27a to duct 27e with an inclination of the throttle 28 as shown in FIG. 3C.

Through the parts of the bedding elements 3a", 3b" connected to the duct 27e, a larger amount of strip air will pass than through the parts of the bedding element connected to the duct 27A. The heat transfer to those parts of the bedding elements passed by strip air, led to duct 27e, will be larger than the heat transfer to the other parts of the bedding elements. The heat front going through the ducts 27a, b, c, d, e will thus travel fastest in those parts of the bedding elements passed by strip air going to the duct 27e. The heat front going through each bedding element will thus successively reach duct 27a, b, c, d, e reaching the duct 27e first and the duct 27a last, if the damper 28 is adjusted as shown in FIG. 3C. Thus, the heat front is controlled to successively reach the gas outlet of the bedding.

One can conceive other embodiments within the frame of the invention. In the examples above, the bedding elements had flat surfaces. The strip air penetration surface can also be bent, e.g. a circular cylindrical mantel surface. The heat front will then be mainly circular cylindrical with an increasing or decreasing bending radius, which in turn depends of whether the penetration surface is concave or convex. In that case it can be arranged that the concentration wave successively reaches a circular cylindrical bedding surface, if the generated circles from the mantel surfaces are not concentrical. Also other modifications than the above mentioned are possible without deviation from the general principles of the invention, nor that the modified device falls outside the limits of the appending claims.

DISCLOSURE OF EXPERIMENTS

In an experimental plant, set up in a way that different types of purifying beddings can be installed, experiments were carried out separating solvent from gas. The experiments included a phase of adsorption, during which solvent-contaminated gas was led through the purifying bedding and solvent was adsorbed by the adsorbent material, and a phase of desorption at which a hot air stream was led through the bedding and solvent was desorped and consequently removed from the adsorbent. The experiments were carried out with three different types of purifying beddings, here designated I, II and III.

The bedding of type I corresponded in its general construction to the bedding 4 in FIG. 1. The bedding of type I had consequently the shape of a rectangular parallelepiped, in this case with the dimensions 0.5 m×0.5 m×0.15 m and was divided into two mutally alike bedding elements 3a, 3b. The slot 7 between the bedding elements was arranged inclined in relation to the square outer surfaces 3f of the bedding. The parallel edges on the side of the bedding elements 3g (FIG. 3A) was 0.05 and 0.1 m, respectively. The adsorption flow as well as the desorption flow were led through the bedding perpendicularly to the square surfaces 3f. The adsorption flow, though, was led from one square surface to the other when passing the bedding elements 3a, 3b, connected in series, and the slot 7. The desorption flow, on the other hand, was parted into two partial flows, each passing one of the connected bedding elements 3a, 3b, connected in parallel, into the slot 7, reuniting into one outgoing desorption flow.

The bedding of type II was not parted into separate bedding elements. It consisted of a homogeneous hexahedron-shaped bedding 4' with a shape that was described with reference to FIG. 2. The square side had the dimension 0.5 m×0.5 m. The smallest rectangular face, the top face with reference to FIG. 2, had the measures 0.5 m×0.15 m. The largest rectangular face, the face heading against the air box 17a', FIG. 2, inclined in relation to the square outer face of the bedding, that is, the face heading against the other air box 17b. The inclination was the same as for the bedding of type I above. The adsorption flow as well as the desorption flow was led through the bedding perpendicularly to the square surface constituting the inlet for the flow, that is, by first passing through the air box 17b'. The outlet surface was the surface that faced the air box 17a', FIG. 2.

The bedding of type III is designated 4" in FIG. 4. It consisted according to conventional technology of a bedding element shaped as a rectangular parallelepiped with the dimensions 0.5×0.5×0.15 m. The adsorption flow and the desorption flow was led through the bedding perpendicularly to the square surfaces.

| Example 1: Purification bedding type I | | |
|---|---|---|
| Adsorption: | Air 1000 m$^3$/h during | 8 h |
| | Solvent content | 0.1 g/m$^3$ |
| | Solvent amount | 0.8 kg |
| | Solvent: | |
| | Xylene | 50% |
| | Styrene | 50% |
| Desorption: | Air 50 m$^3$/h | |
| | Time for desorption | 4 h |
| | Solvent amount | 0.76 kg |
| | Maximum solvent concentration in desorption flow | 5 g/m$^3$ |
| Example 2: Purification bedding type II | | |
| Adsorption: | Air 1000 m$^3$/during | 8 h |
| | Solvent content | 0.1 g/m$^3$ |
| | Solvent amount: | 0.8 kg |
| | Solvent: | |
| | Xylene | 50% |
| | Styrene | 50% |
| Desorption: | Air 50 m$^3$/h | |
| | Time for desorption | 4 h |
| | Solvent amount | 0.76 kg |
| | Maximum solvent concentration in desorption flow | 6 g/m$^3$ |
| Example 3: Purification bedding type III | | |
| Adsorption: | Air 1000 m$^3$/h during | 8 h |
| | Solvent content | 0.1 g/m$^3$ |
| | Solvent amount | 0.8 kg |
| | Solvent: | |
| | Xylene | 50% |
| | Styrene | 50% |
| Desorption: | Air 50 m$^3$/h | |
| | Time for desorption | 4 h |
| | Solvent amount | 0.76 kg |
| | Maximum solvent concentration in desorption flow | 15 g/m$^3$ |

The graph in FIG. 5 shows the content of solvent in the desorption flow at the outlet of the purifying beddings of type I, II and III as a function of time passed since beginning of desorption. From the graph it is evident that the most favourable flow is achieved with purifying bedding of type I. When one has an adsorption bedding shaped as a rectangular parallelepiped, as in the bedding 4", of the conventional system shown in FIG. 4, one achieves a marked concentration peak when the concentration wave penetrates through the bedding reaching the outlet. The phenomena can be avoided by use of this invention, and in particular if it is given the embodiment illustrated in FIG. 1 and described above.

We claim:

1. Apparatus for carrying out a process for desorbing a solvent from a bedding of adsorbent material, the apparatus comprising:
   a bedding of adsorbent material having at least a first and a second bedding surface, the first bedding surface providing a gas inlet and the second bedding surface providing a gas outlet of the bedding during a desorbing process;
   means for causing a hot gas flow to pass through the bedding from the first bedding surface toward the second bedding surface to induce a wave of concentration of solvent that is forced through the bedding by means of the hot gas flow;
   wherein the first and second bedding surfaces are so arranged that the wave of concentration induced by the gas flow in the bedding reaches the second bedding surface successively.

2. Apparatus according to claim 1, wherein the first and second bedding surfaces of the bedding are nonparallel.

3. Apparatus according to claim 2, wherein first and second bedding surfaces are flat.

4. Apparatus according to claim 3, wherein the bedding surfaces with one another form an angle so that the ratio between the longest gas flow path, going from the first bedding surface to the second bedding surface, and the corresponding shortest path is at least equal to 1.3 and at the most equal to 3.

5. The apparatus according to claim 4, wherein the ratio is between 1.6 and 2.0.

6. Apparatus according to claim 1, further comprising a plurality of ducts, which split the gas flow through the bedding into flow fractions, and at least one throttle means for reducing a speed of the gas flow through at least one of said flow fractions.

7. Apparatus according to claim 1, wherein the bedding contains at least two bedding elements which are connected in series during the phase of adsorption, while the bedding elements during the phase of desorption are connected in parallel, and wherein the bedding elements provide a plurality of lengths of gas flow paths that differ between different fractions of the bedding elements.

8. Apparatus according to claim 1, wherein the bedding contains at least two bedding elements which are connected in series during the phase of adsorption, while the bedding elements during the phase of desorption are connected in parallel, and wherein the bedding elements are arranged to cause different fractions of the strip to pass through the bedding elements with different rate magnitudes.

9. An apparatus for cleaning contaminated fluid, comprising:
   a bedding of adsorbent material for placing in the flow path of a contaminated fluid to absorb contaminants from said fluid, the bedding having first and second spaced apart bedding surfaces;
   means for closing off the flow of contaminated fluid to the bedding;
   means for directing a strip gas to flow through the first bedding surface of the bedding toward the second bedding surface;

means for causing the strip gas to reach a first portion of the second bedding surface before reaching a second portion of the second bedding surface; and means for removing the strip gas after the strip gas passes through the bedding;

whereby a peak concentration of strip gas removed from the bedding is reduced.

10. The apparatus of claim 9, wherein the first and second bedding surfaces are non-parallel.

11. The apparatus of claim 10, wherein the first and second bedding surfaces are flat.

12. The apparatus of claim 11, wherein the means for causing the strip gas to reach a first portion of the second bedding surface before reaching a second portion of the second bedding surface comprises a throttle means for reducing a speed of the gas flow through the bedding adjacent the second portion of the second bedding surface.

* * * * *